United States Patent Office 2,815,345
Patented Dec. 3, 1957

2,815,345

QUATERNARY MORPHOLINIUM PHOSPHITES

John D. Zech, Wilmington, Del., assignor to Atlas Powder Company, Wilmington, Del., a corporation of Delaware No Drawing. Application July 14, 1953,
Serial No. 368,006

6 Claims. (Cl. 260—247.2)

This invention relates to new organic morpholinium phosphites and relates more particularly to quaternary morpholinium phosphites which are suitable for various uses as wetting agents, detergents, emulsifying agents, germicides, fungicides, textile softeners, textile lubricants, dyeing assistants, antistatic agents, textile spinning bath assistants, deodorants, etc.

It is an object of the present invention to provide a new group of quaternary morpholinum phosphites.

It is another object of this invention to provide a method of manufacturing the said quaternary morpholinium phosphites.

These and other objects and advantages will become obvious to those skilled in the art from the following disclosure.

The compounds of this invention may be defined by the formula:

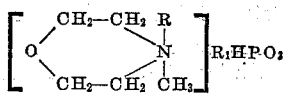

R is an organic radical of 8 to 50 carbon atoms, containing as its main component, a lipophilic radical that contains from 8 to 20 carbon atoms. This radical may be present as an aliphatic hydrocarbon radical. In this form it contains from 10 to 20 carbon atoms. It may be present in the form

wherein

is an acyl radical containing from 10 to 20 carbon atoms, $n$ is 2 to 3 and $x$ is 1 to 10. Such a group is usually obtained by treating morpohline with an alkylene oxide and then esterifying the reaction product with a fatty acid containing from 10 to 20 carbon atoms. The lipophilic radical may be present as a substituent on an aromatic radical, i. e.

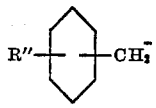

or

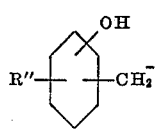

etc., in which case R″ contains from 8 to 16 carbon atoms. It will be obvious to those skilled in the art that there are other types of lipophilic radicals that may also be present in the compounds covered by the present invention.

$R_1$ is a lower alkyl group containing 1 to 12 carbon atoms.

The products of the present invention are prepared by the reaction of a methyl alkyl hydrogen phosphite and a suitable tertiary morpholine. The dimethyl hydrogen phosphite is the preferred phosphite, since it gives much shorter reaction times and the products may be formed at lower reaction temperatures. However, mixed esters may be used, for example, methyl ethyl hydrogen phosphite, methyl butyl hydrogen phosphite, methyl amyl hydrogen phosphite, methyl octyl hydrogen phosphite, methyl lauryl hydrogen phosphite, etc. The morpholine derivatives suitable for the purposes of this invention may be expressed by the formula:

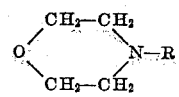

R is a lipophilic organic radical containing from 8 to 50 carbon atoms. The scope of this radical is the same as that given for R in the previous generic formula for the compounds of this invention. Suitable tertiary morpholines include, but are not limited to, N-lauryl morpholine, N-cetyl morpholine, N-octa-decenyl morpholine, N-soyalyl morpholine, N-stearyl morpholine, N-tetradecyl morpholine, the stearate of hydroxy ethyl morpholine, the oleate of hydroxy propyl morpholine, the laurate of polyoxyethylene morpholine, the palmitate of polyoxyethylene morpholine, the oleate of polyoxypropylene morpholine. The alkylene oxide chain in this latter type of compound may contain from 1 to 10 alkylene oxide groups, 2-hydroxy-5-nonyl benzyl morpholine, dodecyl benzyl morpholine, etc. The soyalyl radical is a mixture of aliphatic hydrocarbons obtained by changing —COOH to —CH₂ in the mixture of fatty acids occurring as glycerides in soyabean oil.

The products of the present invention are prepared by reacting a methyl alkyl hydrogen phosphite with a suitable morpholine derivative at a temperature ranging from about 80° to 150° C. The preferred reaction temperature is from 100° to 130° C. The reaction time will vary depending on the phosphite ester used. The dimethyl hydrogen phosphite is much more reactive and, accordingly, less reaction time is required.

The compounds of the present invention possess a unique property in that they readily absorb oxygen from the air. This property suggests that the quaternary morpholinium hydrogen phosphites of this invention are valuable reducing agents.

The following examples are given by way of illustration and are not to be taken as limiting the invention in any way.

Example 1

370 gms. of soyalyl morpholine and 111.5 gms. of dimethyl hydrogen phosphite were reacted on a steam bath for 23½ hours. The product on cooling set up to a stiff semi-solid, which was water soluble, giving clear foaming solutions.

Example 2

341 gms. of cetyl morpholine and 110 gms. of dimethyl hydrogen phosphite were reacted over a steam bath for 23½ hours. The product was a soft solid at room temperature. It was water soluble yielding a clear foaming stable solution.

Example 3

30.5 gms. of 2-hydroxy-5-octylbenzyl morpholine and 11 gms. of dimethyl hydrogen phosphite were heated together in an oil bath at 110° to 120° C. for 4 hours. The product was a soft resinous material, dispersible in water, giving opaque, foaming solutions.

Example 4

32 gms. of 2-hydroxy-5-nonylbenzyl morpholine and 11 gms. of dimethyl hydrogen phosphite were heated together in an oil bath at 110° to 125° C. for 6 hours. The product was a soft resinous material, dispersible in water, giving opaque, foaming solutions.

Example 5

156 parts of cetyl morpholine and 62 parts of methyl ethyl hydrogen phosphite were heated together at 120° to 130° C. for 24 hours. The product was a waxy solid which was methyl cetyl morpholinium ethyl hydrogen phosphite.

Example 6

170 parts of octadecyl morpholine and 62 parts of methyl butyl hydrogen phosphite were heated together at 120° to 135° C. for 24 hours. The product was methyl octadecyl morpholinium butyl hydrogen phosphite.

What is claimed is:

1. A process for preparing compounds of the formula:

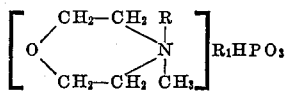

wherein: R is a lipophilic organic radical selected from the group consisiting of alkyl radicals containing from 10 to 20 carbon atoms, radicals of the formula

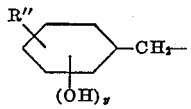

wherein R" is an alkyl radical of from 8 to 16 carbon atoms and $y$ is 0 to 1, and radicals of the formula

wherein

is the acyl radical of a fatty acid containing from 10 to 20 carbon atoms, $n$ is an integer from 2 to 3, and $x$ is an integer from 1 to 10, $R_1$ is an alkyl radical containing 1 to 4 carbon atoms, which comprises reacting a tertiary morpholine derivative of the formula:

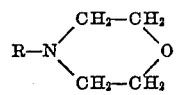

wherein: R is a lipophilic organic radical as defined above with a compound of the formula:

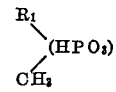

wherein: $R_1$ is an alkyl group containing 1 to 4 carbon atoms, at a temperature of 80° to 150° C. to form a quaternary morpholinium hydrogen phosphite.

2. The process as defined in claim 1 wherein $R_1$ is a methyl group.

3. The process as defined in claim 2 wherein the radical R is soyalyl.

4. The process as defined in claim 2 wherein the radical R is cetyl.

5. The process as defined in claim 2 wherein the radical R is 2-hydroxy-5-octylbenzyl.

6. The process as defined in claim 2 wherein the radical R is 2-hydroxy-5-nonyl benzyl.

References Cited in the file of this patent

UNITED STATES PATENTS

| | | |
|---|---|---|
| 2,295,504 | Shelton | Sept. 8, 1942 |
| 2,380,325 | Niederl et al. | July 10, 1945 |